INVENTORS
YOSHITSUGU TSUCHIYA
KAZUYOSHI UYAMA

ATTORNEY

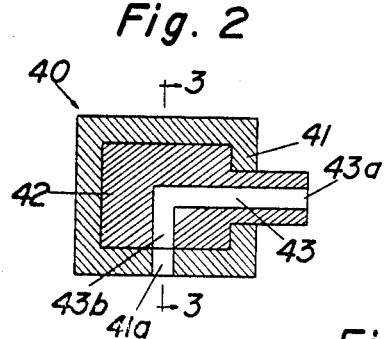
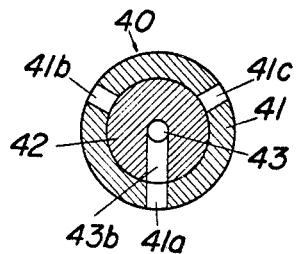
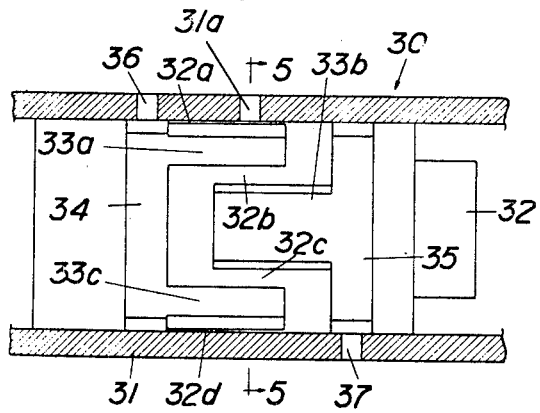
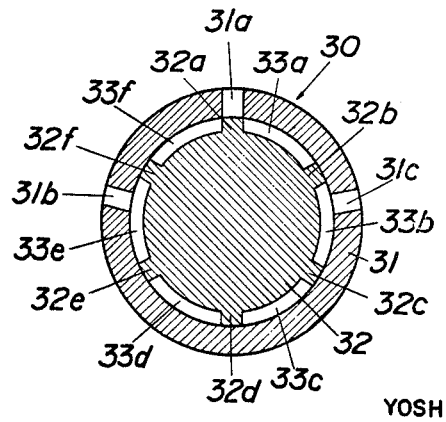

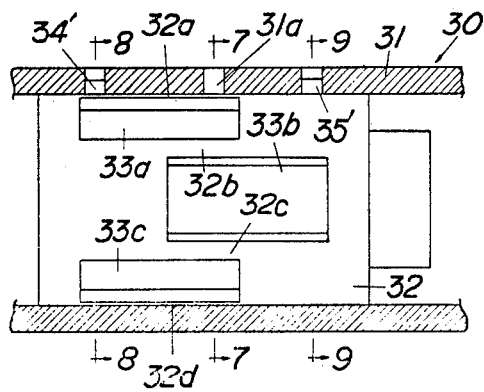
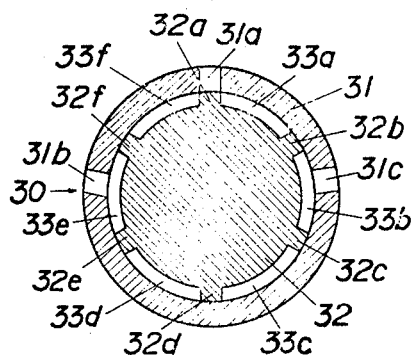
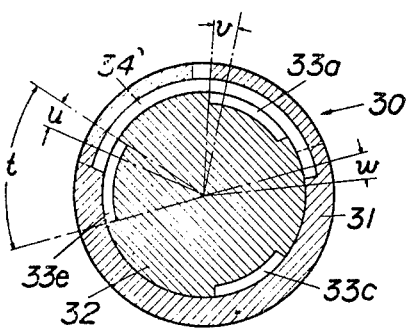
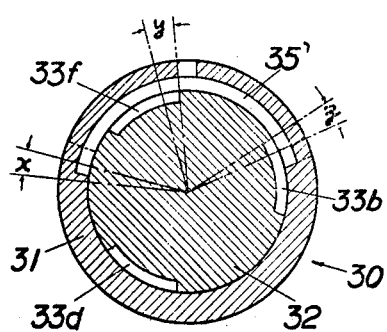
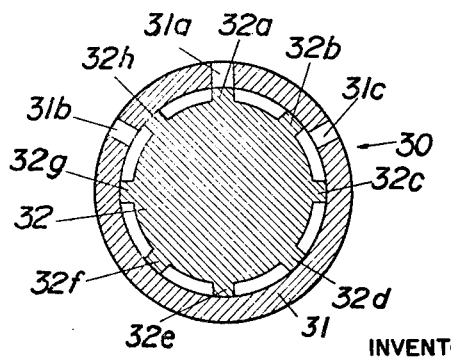

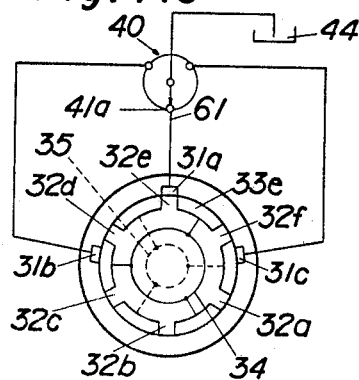
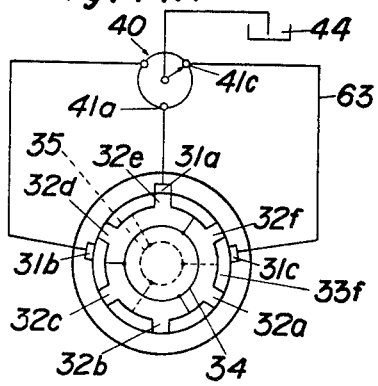
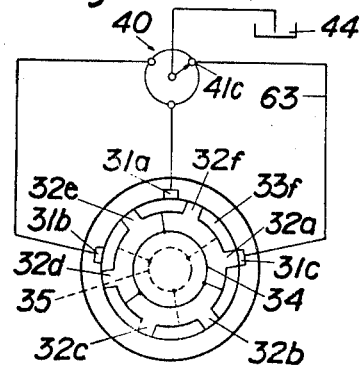
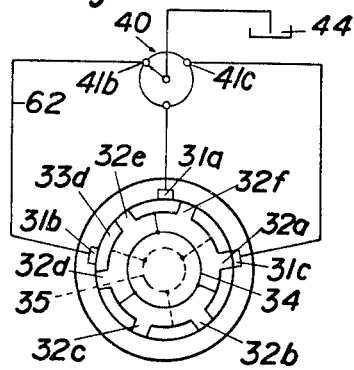
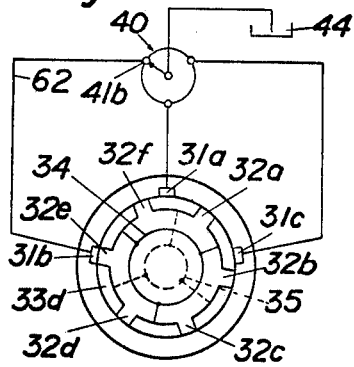
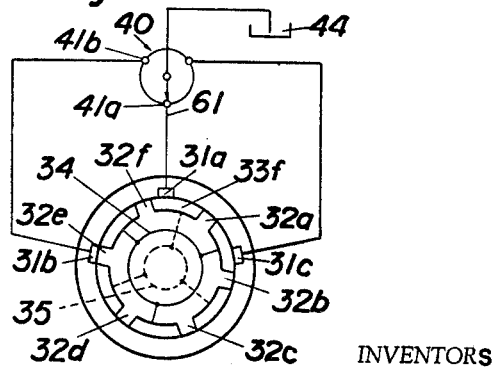

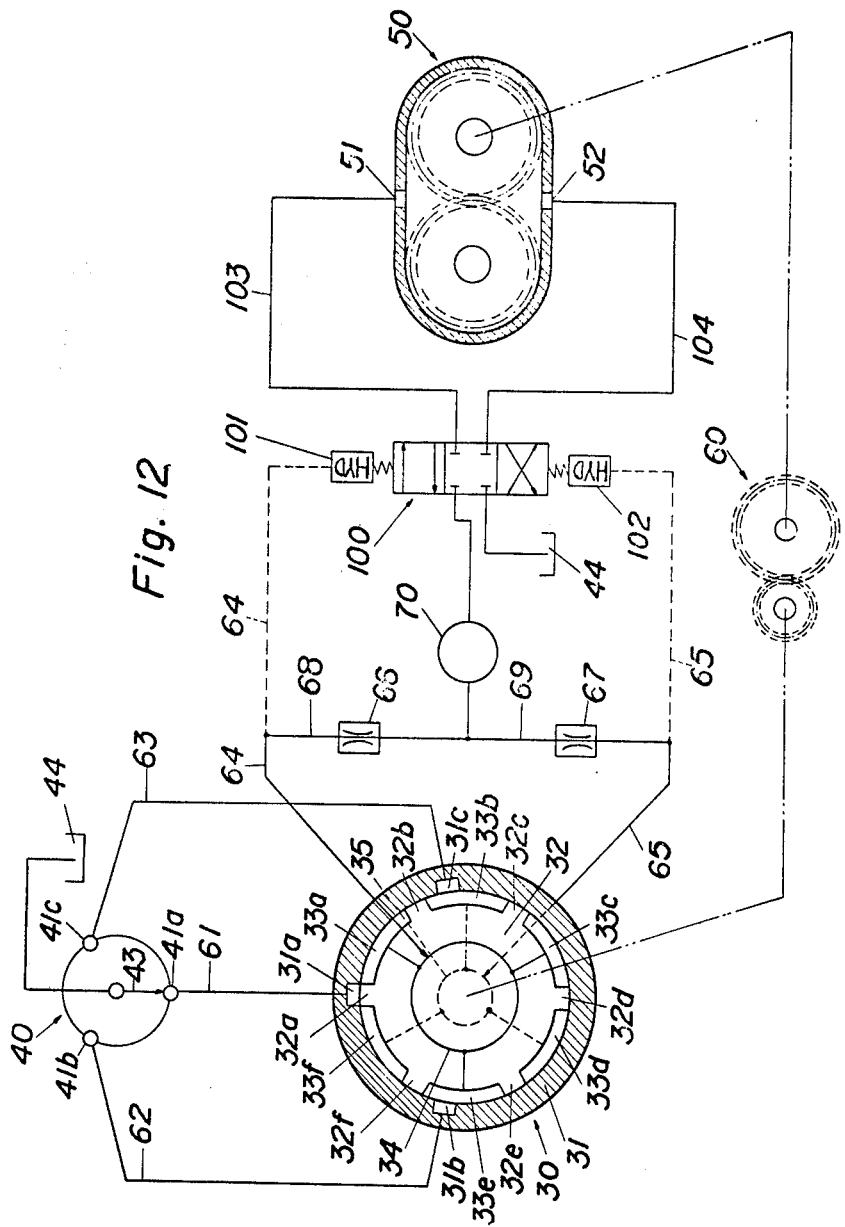

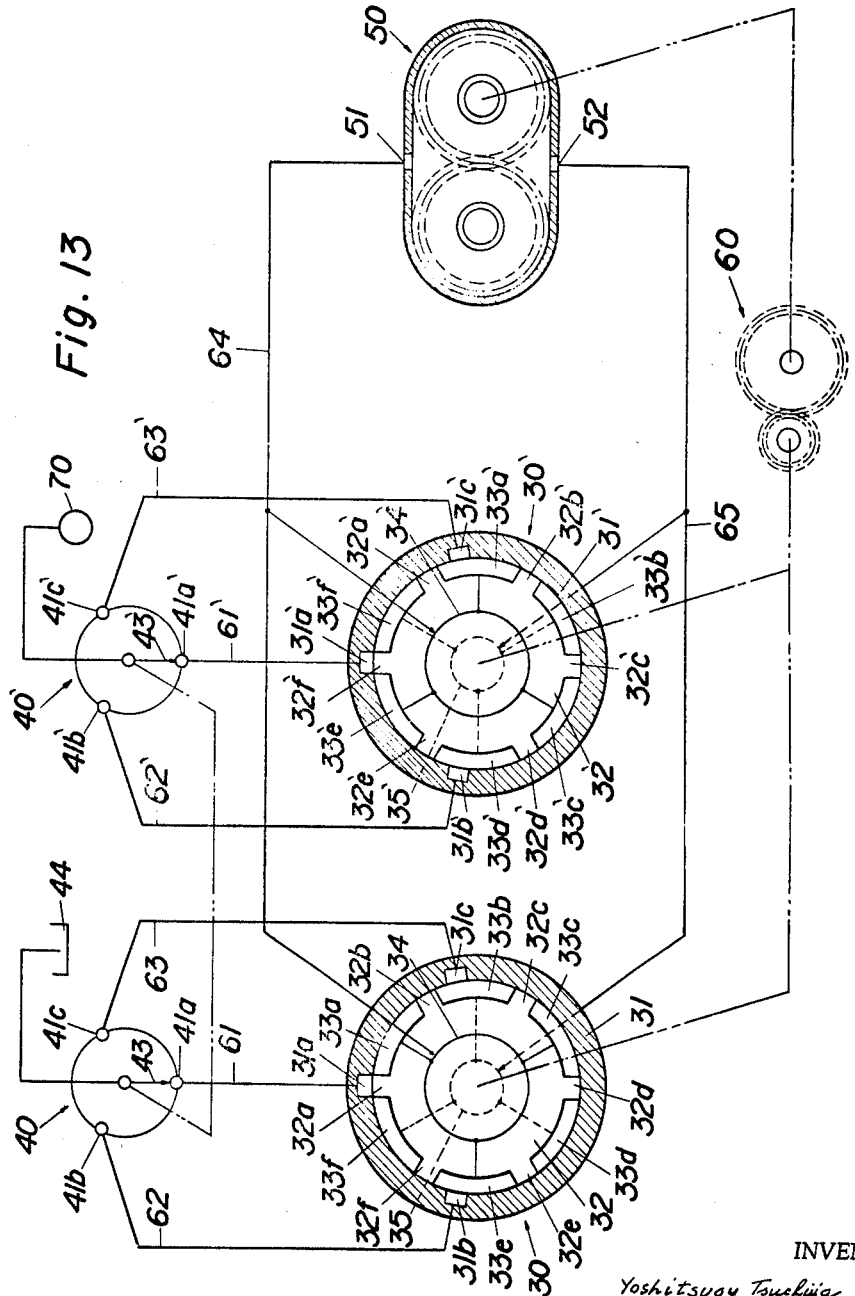

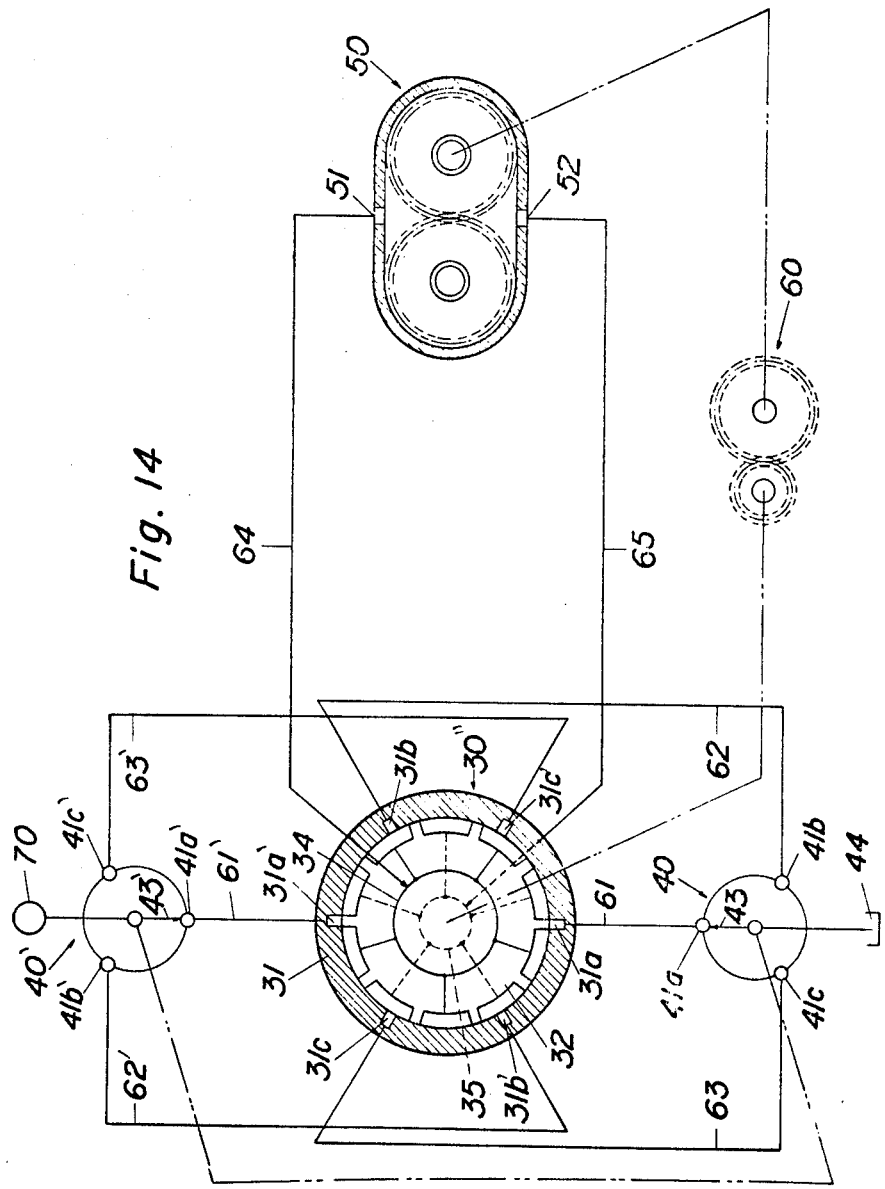

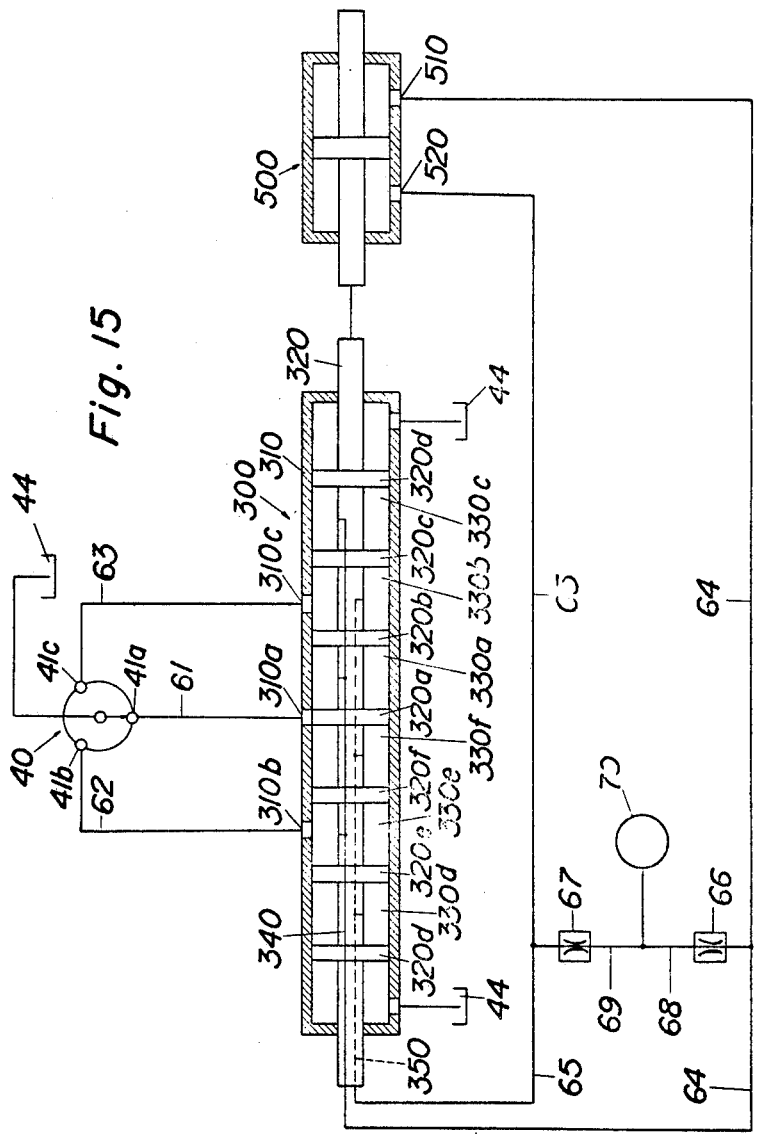

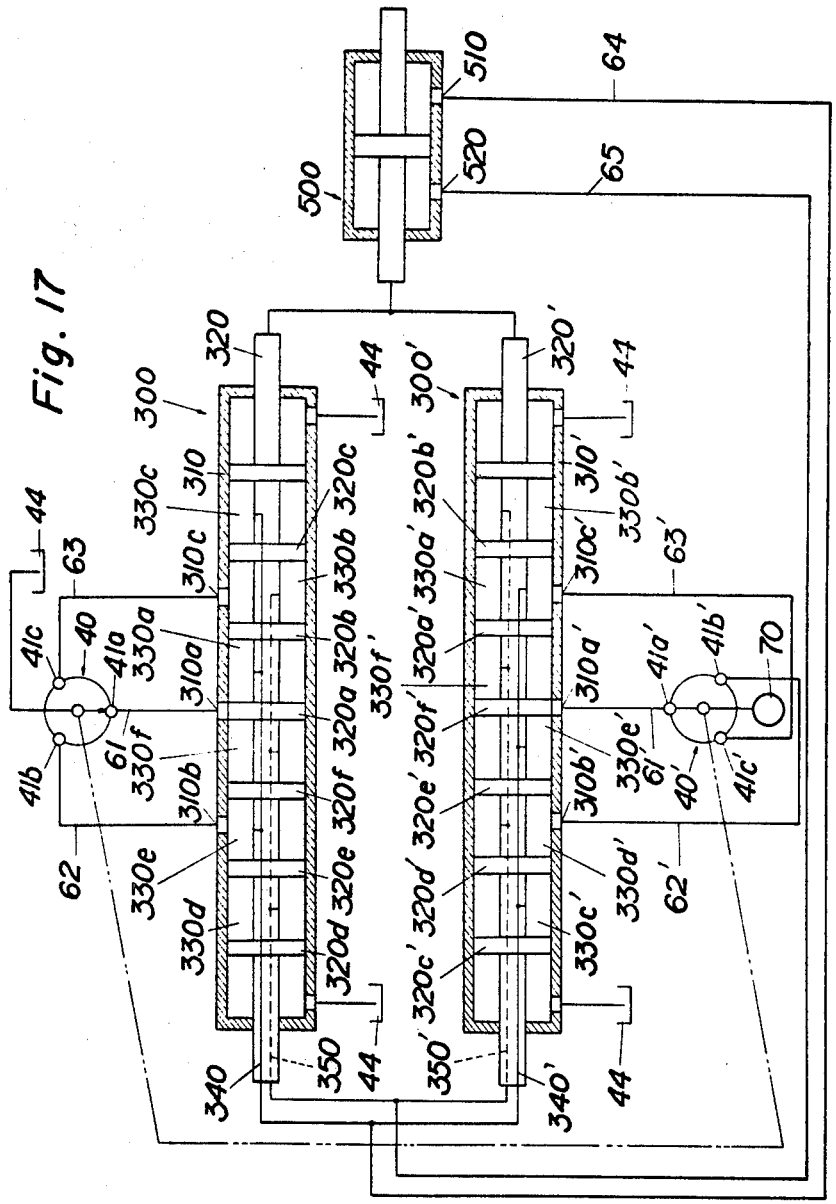

March 24, 1970  YOSHITSUGU TSUCHIYA ET AL  3,502,104
CONTROL VALVE
Filed Dec. 21, 1966  13 Sheets-Sheet 12
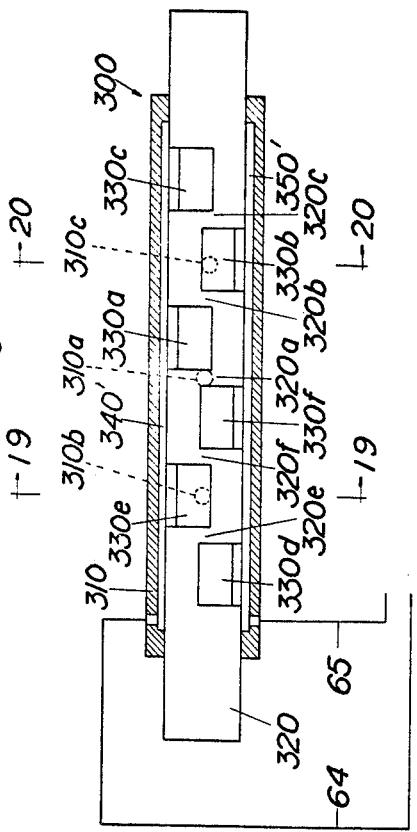
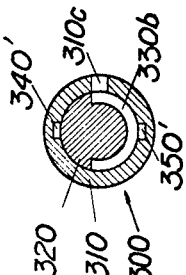
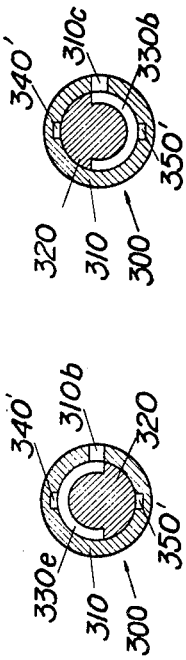
INVENTORS
Yoshitsugu Tsuchiya
Kazuyoshi Uyama
BY Saul Jecies
ATTORNEY

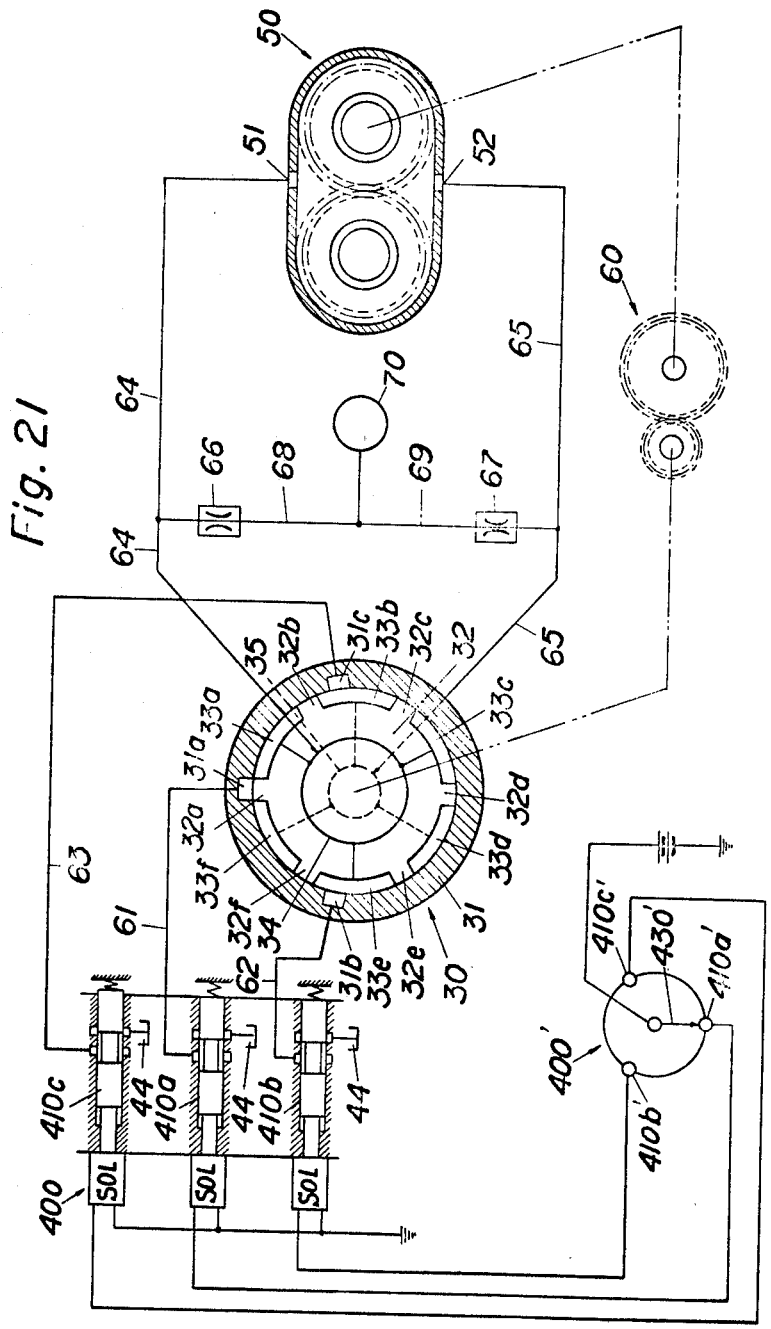

United States Patent Office 3,502,104
Patented Mar. 24, 1970

3,502,104
CONTROL VALVE
Yoshitsugu Tsuchiya, c/o Mr. Hasegawa, 9–22, 1-chome, Kishi-machi, Urawa-shi, Saitama-ken, Japan, and Kazuyoshi Uyama, 23, 3-chome, Nishirokugo, Ota-ku, Tokyo-to, Japan
Filed Dec. 21, 1966, Ser. No. 603,654
Claims priority, application Japan, Dec. 23, 1965, 40/78,974; May 17, 1966, 41/30,890
Int. Cl. F15b 13/02; F16k 11/10
U.S. Cl. 137—596.14     12 Claims

ABSTRACT OF THE DISCLOSURE

The present invention relates to a control valve utilizing a single sleeve member and a single spool member mounted within the sleeve member for relative multi, incremental step-by-step movement in opposite directions, between said members, the walls of the sleeve and spool members being formed to define a plurality of spaced chambers interconnected into two groups of communicating chambers which in turn communicate with a plurality of port means formed in the sleeve. One of the members is further provided with at least two openings one of which communicates with one group of chambers and the other of which communicates with the other group of chambers.

This invention relates to a control valve whose working direction and working distance can be controlled, respectively, by the sequence and number of input signals applied.

It is well known that a hydraulic system permits transmission of huge power by a relatively small equipment, with facility in the control of power and speed. However, accurate control of displacement, that is, exact positioning of a hydraulic motor is impossible even with the operation of a change-over valve or a combination of limit switch and solenoid valve. Thus the control is hardly accomplished with the conventional hydraulic control apparatus. A first attempt made to solve the problem for the applications where accurate positioning of hydraulic motor is essential is so-called electrohydraulic servo mechanism which uses an electro-hydraulic servo valve for feedback control. Still, however, the mechanism has drawbacks in that it is unavoidably complicated in design for the purpose of feedback control and therefore it often goes out of order and proves too costly for general applications as industrial hydraulic equipment. For this reason, a positioning control valve for hydraulic motors of the type described has hitherto been looked for which should be simple in construction, manufacturable at low cost and easy to maintain and handle.

Among the many objects of the invention, one is to provide a control valve for use with a hydraulically operated step-motor which is simple and economical to construct and operate, thereby requiring a minimum of maintenance.

Another object is to provide a control valve which is accurately positionable under control of a selector switch which is selectively movable to determine the sequence, the number of steps and the direction of movement of the control valve.

Objects and advantages and capabilities of the present invention will become apparent from the following description taken in connection with the accompanying drawings, in which:

FIG. 2 is a side view, in vertical section, of a selector valve of rotary type;

FIG. 3 is a vertical sectional view taken along the line 3—3 of FIG. 2;

FIG. 4 is a side view, in vertical section, of a form of control valve of rotary type;

FIG. 5 is a vertical sectional view taken along the line 5—5 of FIG. 4;

FIG. 6 is a side view, in vertical section, of another form of control valve of rotatry type;

Figure 16:
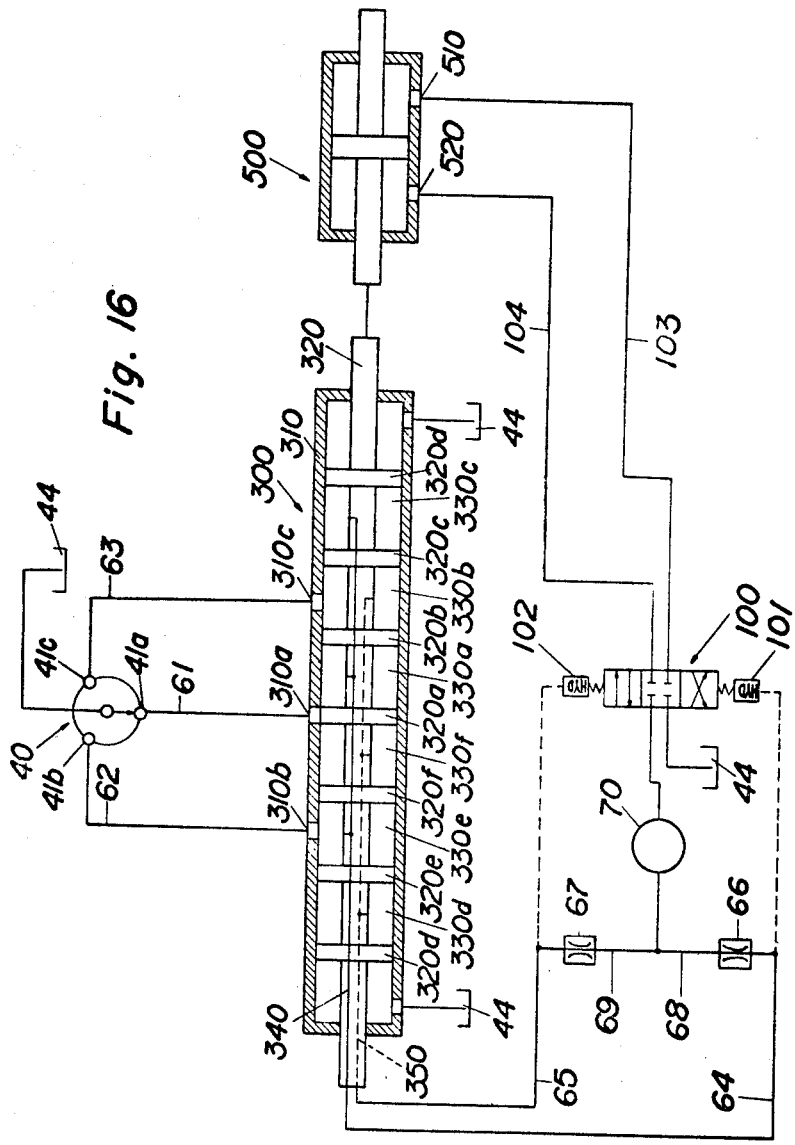

FIGS. 7 through 9 are vertical sectional views taken along the lines 7—7, 8—8, and 9—9, respectively, of FIG. 6;

FIG. 10 is a front view, in vertical section, of another form of control valve of rotary type;

FIG. 11 gives views explanatory of the operation of the control valve of rotary type;

FIGS. 12 through 14 are schematic diagrams of other forms of hydraulic step-motor employing the control valve of rotary type;

FIGS. 15 through 17 are schematic diagrams of other forms of hydraulic step-motor employing the control valve of spool type;

FIG. 18 is a front view, in vertical section, of another form of control valve of spool type;

FIGS. 19 and 20 are vertical sectional views taken along the lines 19–19 and 20–20, respectively, of FIG. 18; and FIG. 21 is a schematic diagram of hydraulic step-motor employing as the selector valve a solenoid valve which is selectively actuated by a selector switch.

Figure 1:
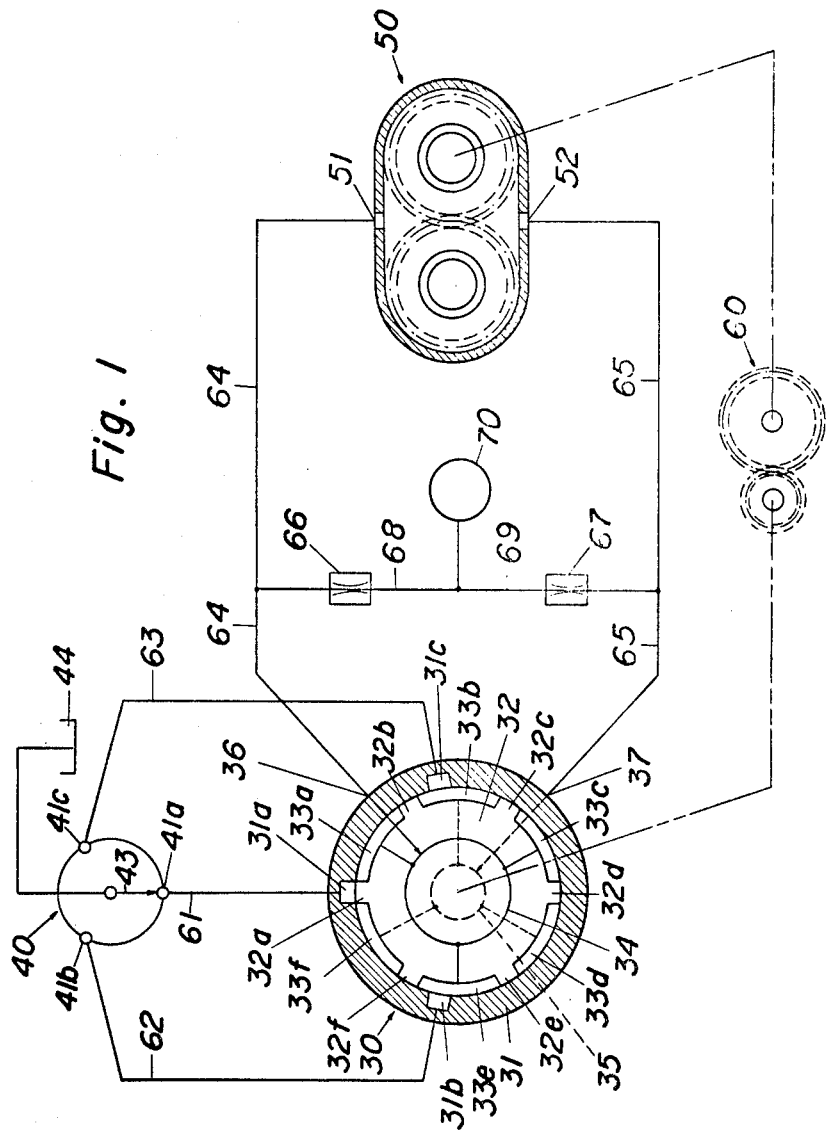
FIG. 1 is a schematic diagram of a hydraulic step-motor employing the control valve of rotary type.

Referring specifically to FIG. 1, a hydraulic step-motor according to the present invention is shown as consisting of three elements, i.e. a control valve 30 of rotary type, a selector valve 40 of rotary type which gives input signals to the control valve 30, and a hydraulic motor 50 which is mechanically coupled to the control valve 30. The selector valve 40 is a type of change-over valve, for example as shown in FIGS. 2 and 3, consisting of a valve casing 41 and a rotating member 42 rotatably fitted therein. Of an L-shaped hole 43 provided through the rotating member 42, one half section 43a always communicates to an oil tank 44 (FIG. 1), while the other half section 43b of the hole 43 communicates selectively to three holes 41a, 41b and 41c provided on the valve casing 41 as the rotating member 42 is revolved manually or by mechanical means, so that the holes 41a, 41b and 41c can be opened by turns into the oil tank 44. In brief the selector valve is intended to open the three passages successively into the oil tank. It may therefore be a valve of any type only if it can achieve the above purpose. The control valve 30, as illustrated in FIGS. 4 and 5, consists of a sleeve 31 having three ports 31a, 31b and 31c, and a spool 32 having six equidistantly disposed lands 32a, 32b, 32c, 32d, 32e and 32f and which rotates within the sleeve 31. The lands 32a through 32f of the spool 32 partition the inside of the sleeve 31 into six spaces 33a, 33b, 33c, 33d, 33e and 33f. Further, the spool 32 is provided with grooves 34 and 35 on both sides, and the spaces 33a–33f alternately communicate with the annular grooves 34 and 35 so that the spaces 33a, 33c and 33e are communicated with one another by the annular groove 34 and the spaces 33b, 33d and 33f are communicated with one another by the annular groove 35. The annular grooves 34 and 35 also communicate, respectively, to holes 36 and 37 made through the sleeve 31. While the hydraulic motor 50 is shown in FIG. 1 in the form of a geared motor, it may be replaced by a plunger motor or other motor of standard construction. Since such motor is available on the market, description of the particulars is deemed omissible.

As shown in FIG. 1, the control valve 30, selector valve 40 and hydraulic motor 50 are arranged in such manner that the ports 31a, 31b and 31c provided on the sleeve 31 of control valve 30 are communicated to the holes 41a, 41b and 41c of the selector valve 40 by way of ducts 61, 62 and 63, and the holes 36 and 37 of the control valve 30 are communicated to the feed ports 51 and 52 of the hydraulic motor 50 by way of ducts 64 and 65. In FIG. 1, for simplicity of the explanation of the oil passages inside the control valve 30, the annular groove 34 provided on the spool 32 is indicated by a full line concentrically with the spool 32, and the annular groove 35 is likewise indicated by a dotted line. The communications inside the valve are diagrammatically shown by connecting the spaces 33a–33f and holes 36 and 37 with respect to the annular grooves 34 and 35, with full lines and dotted lines. The ducts 64 and 65 further communicate to a hydraulic pressure source 70 by way of ducts 68 and 69 which are equipped, respectively, with reducing valves 66 and 67 midways. The output shaft of the hydraulic motor 50 and the spool 32 of the control valve 30 are coupled to each other either directly or through a gear train 60.

In the state, therefore, wherein all of the spaces 33a–33f of the control valve are kept out of communication with the oil tank 44, the fluid pressures inside the ducts 64 and 65 which communicate to both of the feed ports 51 and 52 of the hydraulic motor 50 are kept equal with the pressure at the hydraulic pressure source 70, whereby the hydraulic motor 50 is kept out of operation. Conversely if any one of the spaces 33a–33f is opened into the oil tank 44, the internal pressure of either duct 64 or 65 which communicates with the opened space by way of an annular groove will drop, with the result that the pressure difference between the ducts 64 and 65 urges the hydraulic motor 50 to revolve in a predetermined direction and, at the same time, the revolution is transmitted to the spool 32 of the control valve 30 thereby driving the spool 32, too, in a predetermined direction.

General constructions of the control valve and the hydraulic step-motor employing the same in accordance with the present invention have so far been outined briefly in connection with an embodiment of the invention. Now a more detailed description will be made specifically about the control valve 30 which constitutes the core of the invention.

In opening the three ports 31a, 31b and 31c provided on the sleeve 31 of control valve 30 by turns with the selector valve 40 into the oil tank 44 by way of the holes 41a, 41b and 41c and ducts 61, 62 and 63, it follows that, if the ports are opened into the tank 44 in the order of 31a–31b–31c–31a and so forth, the annular groove 34 provided on the spool 32 of control valve is always kept open into the oil tank 44 through one of the spaces 33a, 33c and 33e. As the result, the pressure inside the duct 64 communicating to the annular groove 34 is decreased and the output shaft of the hydraulic motor 50 is driven in the counter-clockwise direction, and this revolution is transmitted to the spool 32 of control valve 30 by way of the gear train 60 thereby turning the spool 32 in the clockwise direction. Conversely if the ports are opened into the oil tank 44 in the order of 31a–31c–31b–31a and so forth, the annular groove 35 is kept open into the oil tank 44 by way of one of the spaces 33b, 33d and 33f. As the result, the pressure inside the duct 65 communicating to the annular groove 35 is decreased and the output shaft of the hydraulic motor 50 is driven in the clockwise direction, and the revolution is transmitted to the spool 32 of control valve 30 by way of the gear train 60 thereby turning the spool 32 in the counter-clockwise direction. Thus, the relative positions of the three ports 31a, 31b and 31c provided on the sleeve 31 of control valve 30 must be such that, while any one of the lands 32a–32f of spool 32 closes one of the ports 31a, 31b and 31c, the other two ports should not be closed by any of the lands 32a–32f but one should be in the position where it can communicate with one of the spaces 33a, 33c and 33e communicating to the annular groove 34 and the other should be in the position where it can communicate with one of the spaces 33b, 33d and 33f communicating to the annular groove 35.

If it is therefore assumed, as illustrated in FIG. 1, that the selector valve 40 is open with the hole 41a into the oil tank 44 and the port 31a of control valve 30 is opened by the hole 41a into the oil tank 44 by way of the duct 61 in such way that the port 31a is closed by the land 32a of spool 32 to thereby bring the annular grooves 34 and 35 out of communication with the oil tank and keep the whole arrangement in a stabilized or stationary condition, then the port 31b should be always in a position where it can communicate to any one of the spaces 33a, 33c and 33e and the port 31c should be in a position where it can communicate to any one of the spaces 33b, 33d and 33f. Otherwise, it would become impossible that, when the rotating member 42 of selector valve 40 is revolved to open the hole 41b in the wake of the hole 41a into the oil tank 44, the feed port 51 of hydraulic motor 50 which normally communicates with the spaces 33a, 33c and 33e by way of the annular groove 34 and duct 64 is opened into the oil tank 44 whereby the hydraulic motor 50 is allowed to run in the counter-clockwise direction while simultaneously driving the spool 32 of control valve 30 clockwise by way of the gear train 60. It would again be impossible when the selector valve 40 is opened with the hole 41a first and then with the hole 41c into the oil tank that the hydraulic motor 50 runs in the clockwise direction and, at the same time, drives the spool 32 counter-clockwise.

Now, therefore, discussion will be made on the position the port 31b should assume within the overall space occupied by the spaces 33a, 33c and 33e and on the position the port 31c should assume within the overall space occupied by the spaces 33b, 33d and 33f. The spaces 33a–33f defined by the lands 32a–32f of spool 32 are alternately in communication with each other by way of the annular grooves 34 and 35. Accordingly, there should necessarily be an even number of lands 32a–32f provided on the spool 32.

Of these lands 32a–32f, the lands 32b, 32d and 32f are arranged as shown in FIG. 1, and the spaces 33b, 33d and 33f which communicate with the annular groove 35 are disposed on the side for clockwise revolution and spaces 33a, 33c and 33e communicating with the annular groove 34 are disposed on the side for running in the reverse direction. Assuming now that one of the lands 32b, 32d and 32f, for example the land 32b, is closing the port 31a of sleeve 31 which is open into the oil tank 44 and that the spool 32 turns a little in the clockwise direction so that the land 32b opens the port 31a accordingly, the port 31a in turn will open to the space 33a and communicate the annular groove 34 with the oil tank 44. This will result in a drop of fluid pressure in the duct 64 communicating to the annular groove 34 and hence the hydraulic motor 50 will run in the counter-clockwise direction and the revolution of the hydraulic motor 50 will be transmitted by way of the gear train 60 to the spool 32 of control valve 30 to thereby drive the spool in the clockwise direction, with a consequent movement of the spool 32 toward the direction in which the land 32b further opens the port 31a. Conversely if the spool 32 turns slightly counter-clockwise so that the land 32b can open the port 31a accordingly, the port 31a will this time communicate to the space 33b and open the annular groove 35 with respect to the oil tank 44 with the result that the hydraulic motor 50 will start running clockwise and, at the same time, the spool 32 of control valve 30 will turn counter-clockwise so that the land 32b can move toward the direction where it further opens the port 31a.

On the other hand, the lands 32a, 32c and 32e are arranged as shown in FIG. 1 and the spaces 33a, 33c and 33e communicating to the annular groove 34 are disposed on the side for clockwise revolution and the spaces 33b, 33d and 33f communicating to the annular groove 35 are disposed on the opposite side. As will be understood from an assumption that one of the lands 32a, 32c and 32e, for example the land 32a, is closing the port 31a of sleeve 31 which is open into the oil tank 44 (that is, in the state as illustrated in FIG. 1), if the spool 32 moves slightly clockwise in such manner that the land 32a opens the port 31a, the port 31a will communicate to the space 33f and open the annular groove 35 into the oil tank 44 with the result that the hydraulic motor 50 will run clockwise and drive the spool 32 of control valve 30 counter-clockwise so as to move the land 32a in the direction for closing the port 31a again. If, on the contrary, the spool 32 turns slightly counter-clockwise thereby permitting the land 32a to open the port 31a, the port 31a will this time communicate to the space 33a and open the annular grove 34 into the oil tank 44. As the result, the hydraulic motor 50 will turn counter-clockwise and drive the spool 32 of control valve 30 clockwise, thus again moving the land 32a in the direction for closing the port 31a.

The same functions are preformed with the lands 32d, 32f and lands 32c and 32e. Thus, the condition for keeping the spool 32 in the stabilized state by closing one of the ports 31a, 31b and 31c of sleeve 31 which is open into the oil tank 44 with one of the lands 32a–32f of spool 32, is attained merely by the use of one out of the lands 32a, 32c and 32e of spool 32 in closing the port open into the oil tank 44. This means that, out of the lands 32a–32f, the alternately positioned lands 32a, 32c and 32e are lands for stopping the spool 32 in a stabilized manner, that is, stabilizing lands. The rest of lands, or 32b, 32d and 32f, may then be called instabilizing lands which are unable to stop the spool 32 in the stabilized state.

Therefore, if the rotating member 42 of selector valve 40 (FIGS. 2 and 3) is turned clockwise from the state illustrated in FIG. 1 and the port 31a closed by the land 32a is opened, followed by the ports 31b–31c–31a and so forth, into the oil tank 44, the spool 32 turns by 3 steps in the clockwise direction, and this time the land 32e closes the port 31a and resumes the initial stabilized state. As the result, the angle of rotation of the spool 32 over the three steps is equal to a value obtained by dividing 360°, or the angle of a single revolution of the spool 32 by the number of lands, i.e. 6, and then doubled. Further, because the angle of rotation per step of the spool 32 must be constant to meet the requirement of stepmotor, the angle of rotation $\theta_6$ per step of the spool 32 is then $$\theta_6 = 360 \times \frac{2}{6} \times \frac{1}{3} = 40°$$

Thus, in the state wherein the land 32a closes the port 31a (or the state shown in FIG. 1), the port 31b must be in any of the positions each 40 degrees ahead of the lands 32a, 32c and 32e in the clockwise direction. Similarly, the port 31c must be in any of the positions each 40 degres ahead of the lands 32a, 32c and 32e in the counter-clockwise direction.

In the form of control valve 30 shown above as embodying the present invention, the spaces 33a–33f defined by the lands 32a–32f of spool 32 are alternately communicated with the annular grooves 34 and 35 provided on both sides of the spool 32 and the annular grooves 34 and 35 are communicated to the liquid pressure source 70 and the feed ports 51 and 52 of hydraulic motor 50. It should be noted, however, an entirely same effect is achieved of course by replacing the annular grooves 34 and 35 provided on the spool 32 as above by annular grooves 34 and 35 provided on the inner wall of the sleeve 31 in such way that the spaces 33a–33f can be alternately kept in communication with the annular grooves 34 and 35. Considering the annular grooves 34 and 35, it is only necessary that, when one of the lands 32a–32f of spool 32 closing a port among the ports 31a, 31b and 31c of sleeve 31 which is open in the oil tank 44 is changed over to either of the two other ports, either of the feed ports 51 and 52 of hydraulic motor 50 is opened into the oil tank 44 by way of only one of the spaces 33a–33f which communicates to the port open into the oil tank 44 and that the opened state is maintained at least until the port is closed. From this standpoint, therefore, it is not always necessary to provide the annular grooves 34 and 35 on both sides of the spool 32 or sleeve 31 and to communicate therewith the spaces 33a–33f alternately.

By way of example, in the stabilized state as shown in FIGS. 6 and 7 where in the land 32a of spool 32 closes the port 31a of sleeve 31 which is open into the oil tank 44, when the port 31b is opened in the wake of the port 31a into the oil tank 44, it is necessary to form on the sleeve 31 a groove which extends over the whole or part of the area $t$ with respect to the sleeve 31 and to communicate the groove by way of the duct 64 to the feed port 51 of hydraulic motor 50, as shown in FIG. 8, in order to communicate the feed port 51 of hydraulic motor 50 to the oil tank 44 by way of the space 33e which is in communication with the port 31b. However, even though the feed port 51 of hydraulic motor 50 is thus opened into the oil tank 44 and the spool 32 is thereby turned clockwise through the hydraulic motor 50, the hydraulic motor 50 will be stopped together with the spool 32 before the land 32e subsequently closes the port 31b if the groove provided on the sleeve 31 is brought out of communication with the space 33e beforehand. Therefore, this groove establishes its communication with the space 33e as the port 31a is opened into the oil tank 44. Further, unless the communicated state is subtained until the land 32e closes the port 31b, the spool 32 cannot be caused to function in prearranged way. After all it is necessary for this reason that the groove be formed on the sleeve 31 in such manner as to cover the whole or part of the area $u$ shown in FIG. 8. Entirely the same applies to the port 31c and port 31a. Therefore, the groove on the sleeve 31 for communicating to the feed port 51 of hydraulic motor by way of the duct 64 may be of any contour if it faces only the spaces 33a, 33c and 33e provided alternately as shown in FIG. 8 and if it covers the whole or part, each, of the areas $u$, $v$ and $w$. For example, it may take the form of groove 34′ as shown in FIG. 8. On the other hand, the groove on sleeve 31 for communicating to the feed port 52 of hydraulic motor 50 by way of the duct 65 may be of any contour if it faces only the spaces 33b, 33d and 33f as shown in FIG. 9 and if it covers the whole or part, each, of the areas $x$, $y$ and $z$. For example, it may take the form of groove 35′ as shown in FIG. 9.

These grooves 34′ and 35′ need not always be singular as shown in FIGS. 8 and 9 but may take the form of a plurality of grooves which cover the whole or part, each, of the areas $u$, $v$ and $w$ and $x$, $y$ and $z$, in which case it is only necessary to communicate the grooves on the two sides, respectively, to the feed ports 51 and 52 of hydraulic motor 50.

The grooves may be further simplified by such arrangement wherein, when the port of sleeve 31 which is open into the oil tank 44 is closed by one of lands 32a, 32c and 32e of spool 32, the holes or grooves of sleeve 31 which had been communicated to the port through one of the spaces can also be closed. From this viewpoint, the grooves or holes covering part, each, of the areas $u$, $v$ and $w$ and areas $x$, $y$ and $z$ may be replaced by groups of three inter-communicating holes provided on the side of the ports 31a, 31b and 31c in such manner as to contact the areas $u$, $v$ and $w$ and areas $x$, $y$ and $z$, if the areas $u$, $v$ and $w$ and areas $x$, $y$ and $z$ to be covered by the grooves or holes can be minimized. Thus, the grooves or holes on the sleeve 31 to communicate with the feed ports 51 and 52 of hydraulic motor 50 may be such grooves or holes which cover the whole or part, each, of the areas *u*, *v* and *w* and areas *x*, *y* and *z*, or such grooves or holes adjacent the edges of the areas *u*, *v* and *w* and areas *x*, *y* and *z* close to the ports 31*a*, 31*b* and 31*c*, or suitable combinations thereof. Briefly stated, it is merely necessary that the sleeve 31 be provided on both sides thereof with such grooves or holes which, when the ports 31*a*, 31*b* and 31*c* are opened into the oil tank 44 correspondingly to the two groups of alternately disposed spaces, that is, the group of spaces 33*a*, 33*c* and 33*e* and the group of spaces 33*b*, 33*d* and 33*f*, maintain communication by way of the opened port and one of the spaces until at least the port is closed by a land of the spool 32.

Throughout the embodiments of the invention so far given, the control valve 30 has been described as having a spool 32 invariably provided with six lands, accordingly with the rotation angle per step of 40 degrees. However, when in such control valve the operating spindle of spool 32 and the output shaft of hydraulic motor 50 are coupled together by a gear train 60 having a gear ratio of 1:2, as illustrated in FIG. 1, the angle of rotation of the hydraulic motor 50 will be 20 degrees as compared with the angle of rotation per step of the spool 32 in the control valve 30 which is 40 degrees. It will therefore be seen that there are two ways of changing the angle of rotation per step of the hydraulic motor 50. One way is to modify the gear ratio of the gear train 60 which couples the operating spindle of spool 32 with the output shaft of hydraulic motor 50. The other is to increase or decrease the number of lands on the spool 32 in the control valve 30 thereby to change the angle of rotation per step.

In the latter method, the number of lands must be always even, as above pointed out, because the spaces thereby defined must be divided into two groups on the sides of the ducts 64 and 65. If the number of lands on the spool 32 is 8, the angle of rotation $\theta_8$ per step of the spool 32 will then be, as in the preceding embodiment:

$$\theta_8 = 360 \times \frac{2}{8} \times \frac{1}{3} = 30°$$

In short, if the number of lands on the spool 32 is N, then the angle of rotation $\theta_N$ per step of the spool 32 will be given as:

$$\theta_N = 360 \times \frac{2}{N} \times \frac{1}{3} = \frac{240}{N} \text{ deg.}$$

Thus, by increasing or decreasing the number of lands N, the angle of rotation $\theta_N$ per step of the spool 32 can be changed. Of course, even in such cases, when one of the ports 31*a*, 31*b* and 31*c* of the sleeve 31 is closed by one of the lands on the spool 32, the other two ports must be brought to the positions ahead of the lands of even orders in both directions from the closing land by the angle of rotation $\theta_N$ corresponding to one step at that time. Accordingly, if the gear ratio of the gear train 60 is $\epsilon$, then the angle of rotation $\theta$ per step of the hydraulic motor 50 will be:

$$\theta = \frac{240}{N\epsilon} \text{ deg.}$$

Now the operation of the step-motor according to the invention will be described. As noted in the foregoing, the embodiments of control valve 30 of rotary type thus far explained are designed for the same functions, and therefore, for simplicity, the description of the invention will be made hereunder in connection with a hydraulic step-motor as illustrated in FIG. 1 employing a control valve 30 in which, as shown in FIGS. 4 and 5, the spool 32 has six lands and is provided with annular grooves 34 and 35 on both sides and, when the land 32*a* of spool 32 closes the port 31*a* of sleeve 31, the port 31*b* is in a position 40 degrees ahead in the clockwise direction of the land 32*e* and the port 31*c* is in a position 40 degrees ahead in the counter-clockwise direction of the land 32*c*.

Figure 11A:
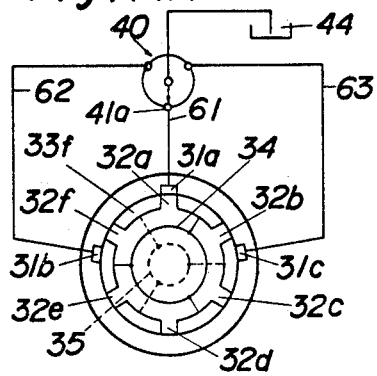

It is assumed that the apparatus according to the invention is in the state as illustrated in FIG. 1 or in the state wherein the port 31*a* of sleeve 31 is closed by the land 32*a* of spool 32 and the through hole 43 of rotating member 42 in the selector valve 40 has chosen the hole 41*a* of valve casing 41 thereby opening the port 31*a* of control valve 30 into the oil tank 44 by way of the duct 61. In the state shown, as long as the selector valve 40 opens only the port 31*a* of control valve 30 into the oil tank 44 while other ports 31*b* and 31*c* are out of communication with the oil tank 44, the annular grooves 34 and 35 are both kept out of communication with the oil tank 44 as illustrated in FIG. 11A. Therefore, the hydraulic fluid pressure from the liquid pressure source 70 is applied to both of the feed ports 51 and 52 of hydraulic motor 50 in communication with the annular grooves 34 and 35 through the ducts 64 and 65, respectively, so that the hydraulic motor 50 is kept out of operation and the spool 32 of control valve 30 is kept stationary.

Figure 11B:
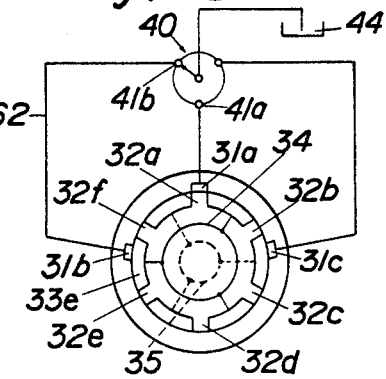
Figure 11C:
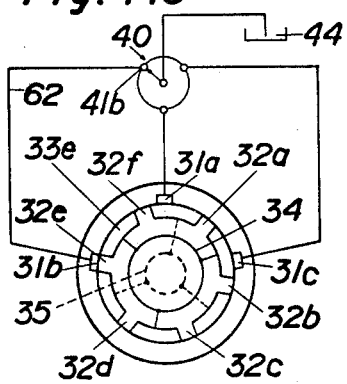

If now the opening into the oil tank 44 is switched over from the port 31*a* to the port 31*b* by means of the selector valve 40, then, as shown in FIG. 11B, the annular groove 34 is opened into the oil tank 44 by way of the space 33*e*, port 31*b* and duct 62, and the feed port 51 of hydraulic motor 50 which communicates to the annular groove 34 by way of the duct 64 is opened into the oil tank 44. As the result, the pressure inside the feed port 51 drops below the pressure inside the feed port 52 on the opposite side, thus urging the output shaft of hydraulic motor 50 to turn counter-clockwise. The revolution is transmitted to the spool 32 of control valve through the gear train 60 and the spool 32 begins turning clockwise. Thus, when the spool 32 has turned by 40 degrees clockwise and the land 32*e* has closed the port 31*b*, the communication of the anular groove 34 with the oil tank 44 by way of the space 33*e*, port 31*b* and duct 62 is shut off. Consequently, the pressure in the feed port 51 of hydraulic motor 50 is increased to the hydraulic fluid of the liquid pressure source 70 which is equal to the pressure of the liquid pressure source 70 which is equal to the pressure in the feed port 52 on the opposite side, and the hydraulic motor 50 is stopped together with the spool 32 of control valve 30, and then a stablized state as illustrated in FIG. 11C is attained. If the gear ratio of the gear train 60 is set to 1:2 at this time, the hydraulic motor 50 will stop at a point turned counter-clockwise by 20 degrees.

Figure 11D:
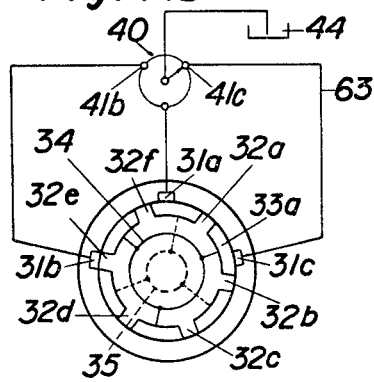
Figure 11E:
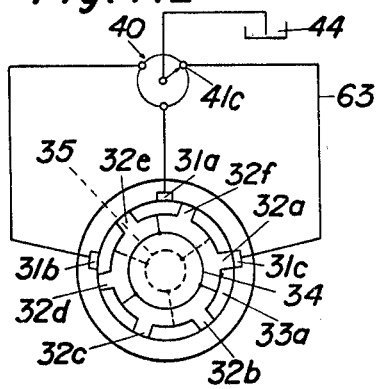
Figure 11F:
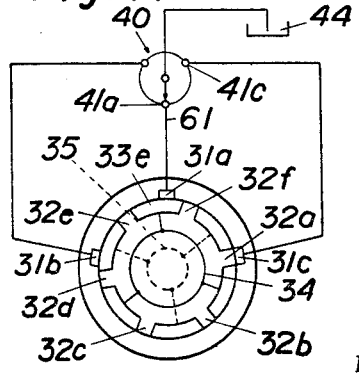

Then, if the opening of the port 31*b* into the oil tank 44 is further changed over to the port 31*c* by the selector valve 40, again the annular groove 34 is opened into the oil tank 44 by way of the space 33*a*, port 31*c* and duct 63 as illustrated in FIG. 11D, whereby the hydraulic motor 50 is driven counter-clockwise and, as the hydraulic motor 50 has turned counter-clockwise by 20 degrees and has revolved the spool 32 clockwise by 40 degrees, the land 32*a* closes the port 31*c* as shown in FIG. 11E and the hydraulic motor 50 and spool 32 are both stopped. Next, if the opening into the oil tank 44 is shifted from the port 31*c* to the port 31*a* by means of the selector valve 40, again the annular groove 34 is opened into the oil tank 44 by way of the space 33*e*, port 31*a* and duct 61 as shown in FIG. 11F, and when the hydraulic motor 50 has turned counter-clockwise by 20 degrees and has driven the spool 32 clockwise by 40 degrees, the land 32*e* closes the port 31*a* as shown in FIG. 11G and the hydraulic motor 50 and spool 32 are both stopped.

As will be understood from a comparison of the states shown in FIG. 11G and FIG. 11A, the only difference between the two states is that the land 32*a* closing the port 31*a* is replaced by the land 32*e* in the latter. The positions of lands and spaces of the spool 32 with respect to the three ports 31*a*, 31*b* and 31*c* of sleeve 31 are entirely same except for the difference in the reference numerals. Therefore, as the selector valve 40 opens the ports of control valve 30 in the order of 31a, 31b, 31c, 31a and so forth into the oil tank 44, the same procedure as described above is repeated and the hydraulic motor 50 is turned intermittently by 20 degrees in the counter-clockwise direction.

If it is then assumed that, from the state shown in FIG. 11G, the rotating member 42 of selector valve 40 is turned in the reverse direction and the communication to the oil tank 44 is thereby shifted from the port 31a to port 31c, then, as shown in FIG. 11H, the annular groove 35 is opened into the oil tank 44 by way of the space 33f, port 31c and duct 63. As the result, the feed port 52 of hydraulic motor 50 which is in communication with the annular groove 35 through the duct 65 is openend into the oil tank 44, whereby the pressure inside the feed port 52 is decreased below the pressure inside the feed port 51 on the opposite side. Thus, the output shaft of hydraulic motor 50 begins turning clockwise and the revolution is transmitted by the gear train 60 to the spool of control valve 30 thus driving the spool 32 counter-clockwise. When the hydraulic motor 50 has turned clockwise by 20 degrees and has driven the spool 32 counter-clockwise by 40 degrees, the land 32a closes the port 31c and the communication of the annular groove 35 to the oil tank 44 by way of the space 33f, port 31c and duct 63 is shut off. Consequently, the pressure in the feed port 52 of hydraulic motor 50 rises to a hydraulic fluid pressure equal to the pressure in the feed port 51 on the opposite side, and the hydraulic motor 50 and spool 32 are altogether brought to a stop with the land 32a closing the port 31c as shown in FIG. 11I.

Next, when the selector valve 40 in the above state is operated to open the port 31b with respect to the oil tank 44, then again, as shown in FIG. 11J, the annular groove 35 is opened into the oil tank 44 by way of the space 33d, port 31b and duct 62, whereby the hydraulic motor 50 is urged to turn clockwise and, when the hydraulic motor 50 has turned clockwise by 20 degrees and has driven the spool 32 counter-clockwise by 40 degrees, the land 32e closes the port 31b as shown in FIG. 11K and the hydraulic motor 50 and spool 32 are both stopped.

Further, when the selector valve 40 has switched the port 31b opening into the oil tank 44 over to the port 31a, the annular groove 35 is all the same opened into the oil tank 44 by way of the space 33f, port 31a and duct 61 as shown in FIG. 11L, and when the hydraulic motor 50 has turned clockwise by 20 degrees and has revolved the spool 32 counter-clockwise by 40 degrees the land 32a of spool 32 closes the port 31a and, in the state as shown in FIG. 11A, the hydraulic motor 50 and spool 32 are both stopped.

As above pointed out, the state as shown in FIG. 11A is entirely same as that in FIG. 11G if the difference in the reference numerals of the lands and spaces is disregarded. Hence, as the ports of control valve 30 are opened by turns into the oil tank 44 by means of the selector valve 40, in the order of 31a, 31c, 31b, 31a and so forth, the hydraulic motor 50 can be turned intermittently by 20 degrees in the clockwise direction.

In the foregoing description of the arrangement according to the present invention, the control valve 30 has been described as having the lands and spaces in such relationship that, when the land 32a is closing the port 31a is provided in the position 40 degrees ahead in the clockwise direction of the land 32e and the port 31c is provided in the position 40 degrees ahead in the counter-clockwise direction of the land 32c. It should be noted, however, that the entirely same functions can be obtained by the same procedure with a control valve 30 wherein the port 31b is disposed in a position 40 degrees ahead in the clockwise direction of the land 32a or 32c and the port 31c is disposed in the position 40 degrees ahead in the counter-clockwise direction of the land 32a or 32e. The operation in such case can be readily understood on the basis of the foregoing description and hence is herein omitted for clarity of the explanation.

Also, while in the above embodiment the control valve 30 is communicated to both of the feed ports 51 and 52 of hydraulic motor 50 by way of the ducts 64 and 65, which in turn are communicated to the liquid pressure source 70 by way of ducts 68 and 69 equipped with reducing valves 66 and 67, respectively, it is also possible, where the capacity of the hydraulic motor 50 is sufficiently large, that, instead of connecting the feed ports 51 and 52 of hydraulic motor 50 directly to the control valve 30 with the ducts 64 and 65, a directional change-over valve 100 of 3-position 4-way type which is normally kept in the neutral (cut-off) position and is actuated by the difference between the liquid pressures inside liquid pressure-actuating chambers 101 and 102 on both sides thereof may be used in such way that the feed ports 51 and 52 of hydraulic motor 50 are communicated to the liquid pressure source 70 and oil tank 44 by way of the valve 100 and ducts 103 and 104 and that the ducts 64 and 65 in communication with the control valve 30 are also communicated with the liquid pressure-actuating chambers 101 and 102 on both sides of the valve 100. With such arrangement, when either of the ducts 64 and 65 communicating the annular grooves 34 and 35 of control valve 30 with the liquid pressure-actuating chambers 101 and 102 on both sides of the directional change-over valve 100 is opened to the oil tank 44 by way of the control valve 30, the liquid pressures inside the liquid pressure-actuating chambers 101 and 102 of the directional change-over valve 100 are differentiated and the consequent switching in the direction will communicate the feed ports 51 and 52 of hydraulic motor 50 with the liquid pressure source 70 and oil tank 44 so that the hydraulic motor 50 can start in the desired direction and can thereafter be operated in the entirely same manner as in the embodiment illustrated in FIG. 1.

Further, in the embodiments described (in connection with FIGS. 1 and 12), when the hydraulic motor 50 is driven, a flow of hydraulic oil is produced which escapes from the liquid pressure source 70 into the oil tank 44 by way of the duct 68 or 69, reducing valve 66 or 67, duct 64 or 65, and annular groove 34 or 35 of the control valve 30. As this flow is non-effective flow which does not contribute in any way to the running of the hydraulic motor 50, some power loss is inevitable.

In FIG. 13 is illustrated an arrangement for eliminating the power loss due to the non-effective flow as above referred to by the use of two control valves for simultaneous switching in the high and low pressure sides of the hydraulic motor 50. To be more precise, in addition to a control valve 30 of the same construction and design as in the embodiments already illustrated (in FIGS. 1 and 12) wherein the three ports 31a, 31b and 31c are opened by turns into the oil tank 44 by means of the selector valve 40, another control valve 30' of the same construction and design is used as shown in FIG. 13. The spools 32 and 32' of the two control valves 30 and 30' are coupled to each other with a phase difference of 360/N degrees (wherein N is the number of lands on the spools 32 and 32') and the operating spindles of the spools 32 and 32' are coupled to the output shaft of hydraulic motor 50, either directly or via a gear train 60, as in the embodiments already described, and three ports 31a', 31b' and 31c' of control valve 30' are disposed in such manner as to be communicated by turns to the liquid pressure source 70 by way of three ducts 61', 62' and 63' and through holes 41a', 41b' and 41c' of the selector valve 40'. On the other hand, annular grooves 34 and 34' of the control valves 30 and 30' are communicated by way of a duct 64 to a feed port 51 for driving the hydraulic motor 50 in the clockwise direction, and annular grooves 35 and 35' are communicated by way of a duct 65 to a feed port 52 for driving the hydraulic motor 50 in the counter-clockwise direction.

The arrangement may be such that, when the port 31a' of control valve 30' is communicated to the liquid pressure source 70 by the cooperated action of the selector valves 40 and 40', the port 31a of control valve 30 is opened into the oil tank 44, and when the port 31b' of control valve 30' is communicated to the liquid pressure source 70, the port 31b of control valve 30 is opened into the oil tank 44, and further when the port 31c' of control valve 30' is communicated to the liquid pressure source 70, the port 31c of control valve 30 is opened into the oil tank. Assuming now that, from the state illustrated in FIG. 13, the selector valves 40 and 40' are switched thereby to communicate the port 31b' of control valve 30' to the liquid pressure source 70 and the port 31b of control valve 30 to the oil tank 44, the liquid pressure source 70 communicates to the feed port 52 of hydraulic motor 50 by way of the selector valve 40', duct 62', port 31b' of control valve 30', space 33d', annular groove 35', and duct 65, in the order mentioned. In the meantime, the feed port 51 of hydraulic motor 50 is opened into the oil tank 44 by way of the duct 64, annular groove 34 of control valve 30, space 33e, port 31b, duct 62, and selector valve 40, in the order mentioned. The output shaft of hydraulic motor 50 then begins running counter-clockwise. The revolution is transmitted through the gear train 60 to the spools 32, 32' of control valves 30, 30', and the spools 32, 32' are both turned clockwise. When the land 32e of spool 32 has closed the port 31b and the land 32d' of spool 32' has closed the port 31b', the hydraulic motor 50 and spools 32, 32' are stopped. Subsequently when the selector valves 40, 40' communicate the port 31c' of control valve 30' to the liquid pressure source 70 and the port 31c of control valve 30 to the oil tank 44, again the liquid pressure source 70 is communicated through the selector valve 40'–duct 63'–port 31c' of control valve 30'–space 33f'–annular groove 35'–duct 65 to the feed port 52 of hydraulic motor 50, while the feed port 51 of hydraulic motor 50 is opened through the duct 64–annular groove 34 of control valve 30–space 33a–port 31c–duct 63–selector valve 40 into the oil tank 44. As the result, the hydraulic motor 50 resumes counter-clockwise running and turns the spools 32, 32' of control valves 30, 30' clockwise. In the positions where the lands 32a and 32f' of spools 32, 32' have closed the ports 31c and 31c', respectively, the hydraulic motor 50 and spools 32, 32' are stopped. Thereafter, as the selector valves 40, 40' communicate the ports of control valves 30, 30' to the oil tank 44 and liquid pressure source 70, in the order of ports 31a, 31b, 31c, 31a and so forth, and 31a', 31b', 31c', 31a' and so forth, the hydraulic motor 50 can be turned intermittently by a predetermined angle in the counter-clockwise direction. Conversely if the selector valves 40, 40' are actuated from the conditions as shown in FIG. 13 thereby to communicate the port 31c of control valve 30 to the oil tank 44 and the port 31c' of control valve 30' to the liquid pressure source 70, then the liquid pressure source 70 is communicated through the selector valve 40'–duct 63'–port 31c' of control valve 30'–space 33a'–annular groove 34'–duct 64 to the feed port 51 of hydraulic motor 50, while the feed port 52 of hydraulic motor 50 is opened through the duct 65–annular groove 35 of control valve 30–space 33b–port 31c–duct 63–selector valve 40 into the oil tank 44. The hydraulic motor 50 is thereby turned clockwise this time, and the revolution is transmitted through the gear train 60 to the spools 32, 32' of control valves 30, 30' so that the spools 32, 32' can both be turned counter-clockwise. In the positions where the land 32c has closed the port 31c and where the land 32b' has closed the port 31c', the hydraulic motor 50 and spools 32, 32' are stopped.

Thereafter, in the same manner as above described, the selector valves 40, 40' are actuated to communicate the ports of control valves 30, 30' to the oil tank 44 and liquid pressure source 70, in the order of ports 31a, 31c, 31b, 31a and so forth, and 31a', 31c', 31b', 31a' and so forth, whereby the hydraulic motor 50 can be turned intermittently by a predetermined angle in the clockwise direction. Although two control valves 30, 30' of the same construction are used in the embodiment shown in FIG. 13, they may be replaced without any change in the performance by a control valve 30'' which combines the two valves 30, 30' in one as shown in FIG. 14. Since the operation in the latter case is entirely the same as with the embodiment illustrated in FIG. 13, any particular description of the combined valve is omitted for simplicity.

In the embodiments shown in FIGS. 13 and 14, it is also possible as in the embodiment of FIG. 12 illustrated as a modification of the embodiment of FIG. 1 to use a directional change-over valve 100 of 3-position 4-way type in lieu of the direct communication between the ducts 64, 65 and feed ports 51, 52 of hydraulic motor 50 in order to actuate the directional change-over valve 100 by switching of high and low pressure sides of the ducts 64, 65 and thereby to control the running direction of the hydraulic motor 50. Since this operation is easily understandable, the description is also omitted for simplicity.

Although the control valve described in the embodiments illustrated in FIGS. 12 to 14 is limited to either the control valve 30 or 30' wherein the spool 32 or 32' is provided with annular grooves 34, 35 or 34', 35' on both sides, it should be noted that of course the same effects can be achieved by replacing it with any of the control valves in the embodiments of the invention previously explained.

Also, while the embodiments described hereinabove (in connection with FIGS. 1 and 12 to 14) invariably employ a hydraulic motor 50 of rotary type, the principles of hydraulic step-motor according to the invention are applicable as well as direct-acting cylinders. One such application is exemplified in FIG. 15. In this case, a control valve 300 of direct-acting type is used in place of the control valve 30 of rotary type. The space inside the sleeve 310 of the control valve 300 is partitioned by six equi-distantly arranged lands formed on the spool 320, i.e. lands 320a, 320b, 320c, 320d, 320e and 320f, into six sub-divided spaces 330a, 330b, 330c, 330d, 330e and 330f. The spaces 330a–330f are divided alternately into two groups, and the spaces 330a, 330c and 330e are intercommunicated by a hole 340 provided through the spool 320, while the spaces 330b, 330d and 330f are intercommunicated by another similar hole 350 provided through the spool 320. The through hole 340 is communicated via duct 64 to a feed port 510 for moving the piston inside a direct-acting type cylinder 500 in the leftward direction (as viewed in FIG. 15), and the through hole 350 is communicated via duct 65 to a feed port 520 for moving the piston rightward (as viewed in FIG. 15). The ducts 64, 65 are communicated to a liquid pressure source 70 by way of ducts 68, 69 which are equipped with reducing valves 66, 67 midways, respectively. The piston of direct-acting cylinder 500 and the spool 320 of control valve 300 are so linked as to move altogether in cooperative relation, and the sleeve 310 of control valve 300 is provided with three ports 310a, 310b and 310c, which in turn are communicated by way of ducts 61, 62 and 63 to holes 41a, 41b and 41c, respectively, of the selector valve 40, whereby the three ports 310a, 310b and 310c of the control valve 300 can be opened by turns into the oil tank 44 by means of the selector valve 40. As in the case with the control valve 30 of rotary type described hereinbefore, the three ports 310a, 310b and 310c on the control valve 300 of direct-acting type are so arranged that, in the state where the port 310a is closed by the land 320a of spool 320, the other two ports 310b and 310c are provided in positions each backwardly of a distance corresponding to one step of the cylinder 500 from a land on the even order as countered either in the leftward or rightward direction from the land 320a.

With such arrangement, if the selector valve 40 in the state, for example, as illustrated in FIG. 15 is switched over from the port 310a of control valve 300 to the port 310b thereby to open the latter into the oil tank 44, the feed port 510 of cylinder 500 is then opened into the oil tank 44 by way of the duct 64, hole 340 of control valve 300, space 330e, port 310b, duct 62, and selector valve 40, in the order mentioned. As the result, the piston of cylinder 500 moves rightward while pulling the spool 320 of control valve 300 in the same direction. In the position where the land 320e of spool 320 closes the port 310b, the feed port 510 of cylinder 500 which has been open into the oil tank 44 is brought out of communication therewith, and therefore the spool 320 of control valve 300 stops together with the piston of cylinder 500. When subsequently the selector valve 40 is switched thereby opening the port 310c into the oil tank 44, again the feed port 510 of cylinder 500 is opened into the oil tank 44 through the duct 64, hole 340 of control valve 300, space 330a, port 310c, duct 63, and selector valve 40. Accordingly, the piston of cylinder 500 again begins moving rightward while pulling the spool 320 of control valve 300 therewith and comes to a stop where the land 320a of spool 320 has just closed the port 310c. Thereafter, in the same manner as described, the ports of control valve 300 are opened successively into the oil tank 44 by means of the selector valve 40, in the order of ports 310a, 310b, 310c, 310a and so forth. In this way the piston in the cylinder 500 can be moved rightward intermittently over a predetermined distance. Conversely when the selector valve 40 in the state shown in FIG. 15 is actuated to open the port 310c into the oil tank 44, this time the feed port 520 of cylinder 500 is opened through the duct 65, hole 350 of control valve 300, space 330b, port 310c, duct 63, and selector valve 40 into the oil tank 44, whereby the piston of cylinder 500 is moved leftward while urging the spool 320 of control valve 300 in the same direction. As the land 320c of spool 320 closes the port 310c, the piston of cylinder 500 and the spool 320 of control valve 300 are both stopped. With a repetition of this, the selector valve 40 is actuated to open the ports of control valve 300, in the order of 310b, 310a, 310c, 310b and so forth, into the oil tank 44, so that the piston inside the cylinder 500 can be moved leftward intermittently over a predetermined distance.

In the form of direct-acting cylinder according to the invention which is illustrated in FIG. 15, like the modification shown in FIG. 12 of the embodiment in FIG. 1 which employs a hydraulic motor of rotary type, a directional change-over valve 100 of 3-piston 4-way type may be used as shown in FIG. 16 instead of directly transmitting the pressure drop in ducts 64, 65 to the cylinder 500 for operating the latter. It is further possible, like the embodiment shown in FIG. 13, to use two control valves 300, 300' of direct-acting type as shown in FIG. 17. In such cases, the operations are readily understandable on the basis of the explanations taken in connection with FIGS. 12 and 13, and therefore the description in further details is omitted for simplicity.

In the foregoing description with reference to FIGS. 15 through 17, the sleeve 310 of control valve 300 is described as being partitioned by lands on the spool 320 into six sub-divided spaces 330a–330f. It should be noted, however, that in this case again the movable distance per step of piston inside the cylinder 500 can of course be adjusted without any change in the overall length of the sleeve 310, by increasing or decreasing the number of lands on the spool 320 while maintaining an even number of spaces. Also, the movable distance per step of the piston inside the cylinder 500 can be adjusted as well by increasing or decreasing the length of the sleeve 310 itself without changing the number of lands on the spool 320. It is further possible that, whereas in the control valve 300 used in the above embodiment (FIGS. 15 to 17) the spaces 330a–330f are alternately intercommunicated by holes 340, 350 provided through the spool 320, there may be formed two groups of spaces, i.e. the group of 330a, 330c and 330e and the group of 330b, 330d and 330f staggered on the opposite sides of the spool 320, as shown in FIGS. 18 to 20, so that the groove 340' for the inter-communication of the spaces 330a, 330c and 330e and the groove 350' for the inter-communication of the spaces 330b, 330d and 330f can be both provided on the inner surface of the sleeve 310. With such arrangement, the same description as made in respect of the control valve 30 of rotary type applies. The grooves 340', 350' need not be singular grooves respectively, but in brief they may be grooves or holes provided in the sleeve 310 which, when the ports 310a, 310b and 310c opposite to the group of spaces 330a, 330c and 330e and the group of spaces 330b, 330d and 330f are opened by turns into the oil tank 44, can be in communication with the opened port through one of the spaces and which can maintain the communication until at least when the port is closed by any land on the spool 320.

Since the embodiments of the invention illustrated in FIGS. 1 and 12 through 17 are invariably equipped with a selector valve 40 of rotary type as the valve for opening by turns the ports 31a, 31b and 31c on the control valve 30 or the ports 310a, 310b and 310c on the control valve 300 into the oil tank 44, it is necessary that the control valve and the selector valve for giving numerical instructions must be separated from each other and must be inter-communicated via three ducts, to a great disadvantage for remote control. Therefore, in the applications where remote control is desired, the rotary type selector valve may be replaced by a group of electromagnetic valves which are selectively actuated by a selector switch so that the ports of control valve can be opened by turns into the oil tank.

In the arrangement illustrated in FIG. 21, a selector valve 400 is composed of three electromagnetic valves 410a, 410b and 410c and a selector switch 400' for selectively actuating the three valves. By bringing the movable contact 430' of the selector switch 400' by turns into contact with the fixed contacts 410a', 410b' and 410c', the electromagnetic valves 410a, 410b and 410c are selectively excited and opened, whereby the ducts 61, 62 and 63 in communication with the ports 31a, 31b and 31c of control valve 30 can be communicated in succession to the oil tank 44. In selectively actuating the electromagnetic valves 410a, 410b and 410c, any automatic control system of known type may be employed in lieu of such selector switch 400'. It will then become possible that the electromagnetic valves 410a, 410b and 410c which constitute the selector valve 400 are easily accommodated in the step-motor and therefore the ducts for the inter-communication of the electromagnetic valves 410a, 410b and 410c with the ports 31a, 31b and 31c of control valve 30 are omitted for simplicity in handling. Also, because the apparatus depends on the electrical contacts for the generation of input, the pulse generation can be effected in most simplified way. Further, because the input signals can be transmitted through wire, no restriction is given to the distance between the input and output units and remote control of a load from a considerably distant point is rendered possible.

In the explanation made above in connection with FIG. 21, the selector valve 40 of rotary type used in the embodiment of hydraulic step-motor shown in FIG. 1 is replaced by a selector valve 400 of electromagnetic valve type. It should be noted in this connection that the selector valve 400 of electromagnetic valve type can likewise replace the selector valves 40, 40' of rotary type as illustrated in FIGS. 12 through 17.

Also, while the foregoing description of control valve 30 or 300 is limited to the valve wherein the sleeve 31 or 310 is provided with three ports 31a, 31b and 31c or 310a, 310b and 310c, the control valve 30 or 300 may use a sleeve 31 or 310 which is provided with a plurality of sets of ports so that they may be opened by turns into the oil tank 44 under certain conditions because the ports on the sleeve 31 or 310 are provided in a set of three and may be replaced by any set of three ports which can meet the same requirements.

Although we have illustrated and described our invention in connection with some preferred embodiments thereof, it is manifest that numerous modifications and variations may be resorted to without departing from the spirit and scope of the invention. It is therefore desired that all such modifications and variations which could substantially achieve the effects of our invention through the use of a substantially same or equivalent apparatus in the scope of our invention as defined in the appended claims.

What we claim is:

1. A control valve comprising a single sleeve member, a single spool member mounted within said sleeve member for, movement relative thereto, said spool member being provided with a plurality of spaced lands between which and the inner wall of the sleeve member are defined a plurality of spaced chambers interconnected into two groups of communicating chambers, the communicating chambers of one group being isolated from the communicating chamber of the other group, said single sleeve member for said single spool member being formed with inlet port means adapted for individual selected coupling with a fluid source for admitting fluid within said sleeve member for communication with predetermined chambers defining one of said groups of chambers, said spool member being moved relative to said sleeve member in multi-incremental steps as a function of fluid flow through said inlet port means, one of said members being further provided with at least two openings, one of which communicates with one said one of said groups of chambers comprising alternately disposed chambers and the other of which communicates with said other group of chambers intervening said one group of alternate chambers.

2. A valve according to claim 1, wherein said spool member is provided with an even number of equidistantly spaced lands to define therebetween a like number of equidistantly spaced chambers.

3. A valve according to claim 2, wherein said plurality of port means in said sleeve member comprise three ports positioned relative to the lands on the spool member so that when one of the ports is closed by one of the lands, one of the two remaining ports is positioned between the immediately succeeding land and the next following land on one side of said one of said lands and the other of the two remaining ports is positioned between the immediately succeeding land and the next following land on the other side of said one of said lands.

4. A valve according to claim 3, wherein said spool member is rotatable within said sleeve member and the two remaining ports are angularly displaced from their respective next following land by 240–N degrees, where N is equal to the member of lands provided on the spool member.

5. A valve according to claim 4, wherein said spool member is formed at opposite end portions with grooves, the grooves at one end portion serving to interconnect said one group of chambers with one of said openings and the groove at the opposed end portion serving to interconnect said other group of chambers with the other of said two openings, said openings being formed in the spool member.

6. A fluid pressure operated system comprising a control valve having a sleeve member, a spool member mounted within said sleeve member for relative movement between said members, said spool member being provided with a plurality of spaced lands between which and the inner wall of the sleeve member are defined a plurality of spaced chambers interconnected into two groups of communicating chambers, said sleeve member being formed with a plurality of port means adapted during said relative movement to sequentially communicate with said groups of chambers, one of said members being further provided with at least two openings, one of which communicates with one said group of chambers comprising alternately disposed chambers, and the other of which communicates with another of said group of chambers intervening said one group of alternate chambers, said spool member being adapted to be mechanically connected to a motor for driving the spool member, and a fluid supply including a fluid reservoir and being operatively connected to said control valve, said fluid supply also being adapted to be connected to said motor which when operated drives the control valve.

7. A system according to claim 6, wherein said plurality of port means in said sleeve member comprise three ports positioned relative to the lands on the spool so that when one of the ports is closed by one of the lands, one of the two remaining ports is positioned between the immediately succeeding land and the next following land on one side of said one of said lands and the other of the two remaining ports is positioned between the immediately succeeding land and the next following land on the other side of said one of said lands.

8. A system according to claim 7, including a selector switch having a rotating member formed with a passage therein communicating at all times with said fluid reservoir and being further formed with three spaced-apart openings adapted to be selectively connected to said reservoir by said rotating member, said three openings being operatively connected to said three ports formed in said sleeve member for passage of fluid between one of the ports and one of the openings in the switch in dependence on the position of said selector switch and the position of the lands on the spool member with respect to the ports on the sleeve member, said fluid supply including a high pressure source operatively connected by means of reducing valves to said two openings, formed in said sleeve member, and to said motor.

9. A system according to claim 6, wherein said spool is mounted for axial reciprocation relative to said sleeve member, said fluid supply including a high pressure source operatively connected to said openings in said spool member, said port means being selectively connectable to said fluid reservoir and when so connected a drop in fluid pressure resulting in that group of alternatively positioned chambers which is in communication with such port means.

10. A fluid pressure operated system comprising first and second control valves each having a sleeve member, a spool member mounted for rotation within each sleeve member, each said spool member being provided with a plurality of lands between which and the inner wall of the sleeve member are defined a plurality of spaced chambers, each said sleeve member being formed with three ports adapted during rotative motion of each said spool to sequentially communicate with their respective chambers and being further provided with at least two openings one of which communicates with one group of alternately positioned and interconnected chambers and the other of which communicates with another group of interconnected chambers intervening said one group of alternate chambers, said spool members of said first and second control valves being adapted to be connected to a fluid-operated motor for driving said spool members, and a fluid supply including a fluid reservoir adapted to be selectively connected to one of the ports of said first control valve, said fluid supply including a high pressure source adapted to be selectively connected to one of the ports of said second control valve, fluid from said openings formed in the spool members of the first and second control valves being adapted to flow through the motor.

11. A system according to claim 10, wherein said first and second control valves are integrally formed.

12. A fluid pressure operated system comprising first and second control valves each having a sleeve member, a spool member mounted within each sleeve member for reciprocative movement relative thereto, each said spool member being provided with a plurality of lands between which and the inner wall of the sleeve member are defined a plurality of spaced chambers, each said sleeve member being formed with three ports adapted during said reciprocative movement between said members to sequentially communicate with their respective chambers which are interconnected in two groups, each of said spool members being provided with at least two openings one of which communicates with one of said groups of chambers comprising alternately positioned and interconnected chambers and the other of which communicates with another group of said chambers comprising interconnected chambers intervening said one group of alternate chambers, each of the spools being adapted to be connected to a piston-type motor, and a fluid supply including a fluid reservoir adapted to be selectively connected to one of the ports of said first control valve, said fluid supply including a high pressure source adapted to be selectively connected to one of the ports of the second control valve, fluid being adapted to flow from said openings formed in the spool member of the first and second control valves to feed ports of the motor.

References Cited

UNITED STATES PATENTS

| | | | |
|---|---|---|---|
| 2,313,257 | 3/1943 | Nelson | 137—625.24 |
| 2,547,929 | 4/1951 | Dawson | 137—625.23 |
| 3,129,644 | 4/1964 | Andersen | 137—625.23 XR |
| 3,213,881 | 10/1965 | Findlay et al. | 137—596 |

HENRY T. KLINKSIEK, Primary Examiner

U.S. Cl. X.R.

91—51; 137—625.23